Feb. 15, 1949.  H. B. LIGHT  2,461,609
COMBINATION CRADLE AND PERAMBULATOR
Filed Nov. 23, 1946
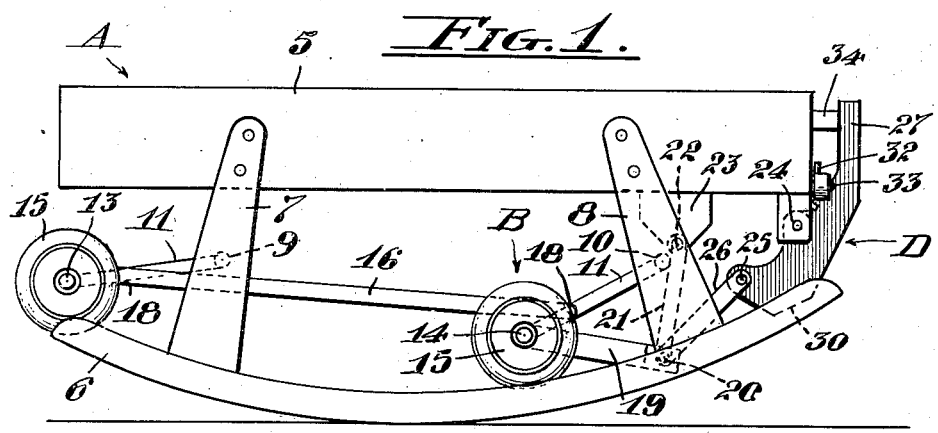
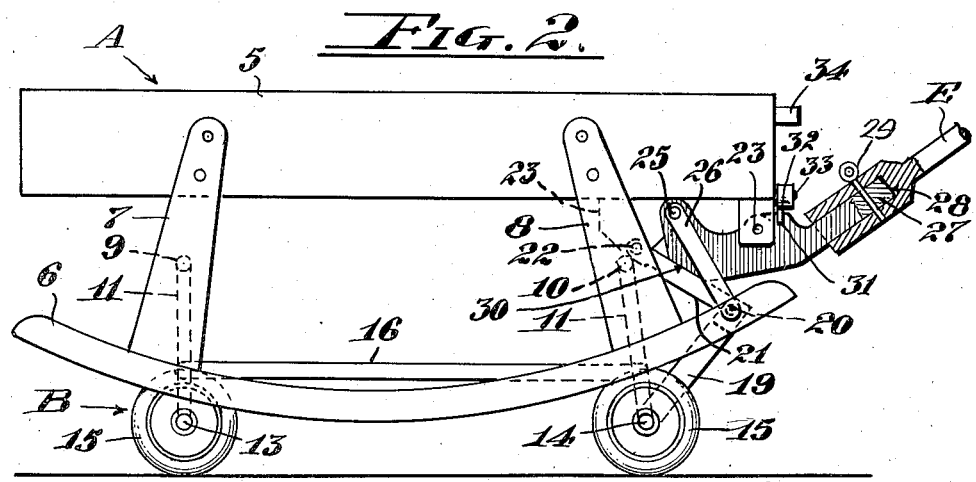
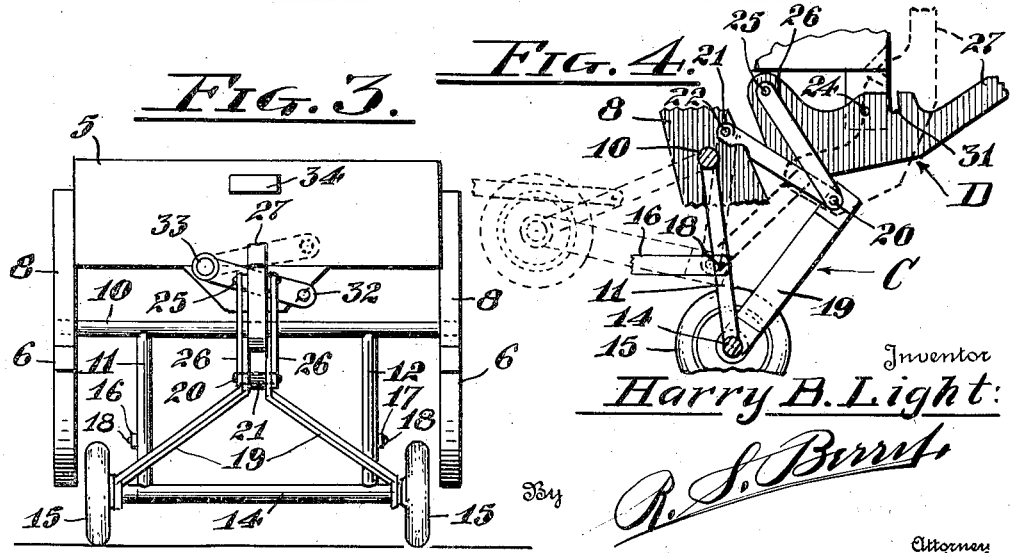
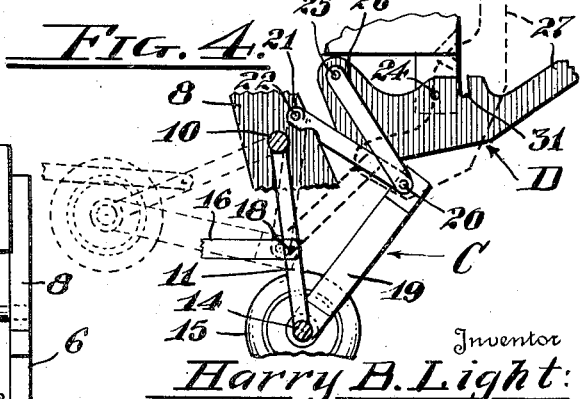
Inventor
Harry B. Light Patented Feb. 15, 1949

2,461,609

UNITED STATES PATENT OFFICE 2,461,609

COMBINATION CRADLE AND PERAMBULATOR

Harry B. Light, San Gabriel, Calif.

Application November 23, 1946, Serial No. 711,871

7 Claims. (Cl. 280—31)

This invention relates to a combined cradle and perambulator and has as its primary object the provision of a retractable running gear in association with a cradle together with operating mechanism whereby the cradle may be converted into a wheeled vehicle and vice versa.

Another object is to provide a cradle having conventional rockers and equipped with a retractable four wheeled running gear adapted when retracted to permit the support and operation of the cradle on its rockers and when advanced afford a wheeled support on which the cradle may be trundled and utilized as a carriage.

A further object is to provide a simple and effective means for operating the retractable running gear in effecting its movement to and from its retracted position, and to provide dependable means for releasably fastening the running gear in either its advanced operative position or in its retracted inoperative position.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a view in side elevation of the combined cradle and perambulator showing the running gear thereof in its retracted inoperative position;

Fig. 2 is a view similar to Fig. 1 showing the running gear in its advanced operative position;

Fig. 3 is a view in elevation of the rear end of the structure shown in Fig. 2; and Fig. 4 is a detail in elevation of the retractable running gear actuating mechanism with parts broken away and showing it in the gear advanced position in full lines and in the gear retracted position in dotted lines.

Referring to the drawings more specifically, A indicates generally a cradle embodying a bed 5 which is fitted with a pair of rockers 6 each of which is connected to the bed by front and rear posts 7 and 8.

In carrying out the invention the cradle A is fitted with a retractable running gear B adapted to be disposed in an inoperative position so that the cradle may be rested on its rockers as shown in Fig. 1, and also adapted to be disposed in an advanced operative position to support the cradle on wheels as shown in Fig. 2 so as to form a perambulator.

The running gear B embodies a pair of rock shafts 9 and 10 carried respectively on the front and rear posts 7 and 8, a pair of parallel rods 11 and 12 affixed to each of the rock shafts 9 and 10, an axle 13 and 14 affixed to the outer ends of each pair of rods 11 and 12, wheels 15 on the ends of each axle, and tie rods 16 and 17 connecting the rods 11—11 and 12—12 intermediate the rock shafts 9 and 10 and the axles 13 and 14. The ends of the tie rods 16 and 17 are attached to the rods 11 and 12 by pivots 18.

The rods 11 and 12 are of such length that when disposed in a depending position the wheels 15 will project below the rockers 6 as shown in Fig. 2.

Pivotally connecting with the axle 14 is a yoke 19, the outer end of which is connected by a pivot 20 to one end of a link 21, the other end of which is pivoted at 22 to a bracket 23 projecting from the underside of the bed A. The yoke 19 and link 21 constitute a toggle C which is adapted to be actuated to effect swinging movement of the running gear to and from its advanced or retracted positions.

Means are provided for actuating the toggle C and for releasably locking it in both an advanced and a retracted position, which means is here shown as comprising a rocker arm D pivoted at 24 on the bed 5, one end of which arm is connected by a pivot 25 to parallel links 26 leading to and engaging the pivot 20 connecting the yoke 19 and the link 21. The other end of the rocker arm D is in the form of a stem 27 which is detachably connected to a handle E formed with a socket 28 to receive the stem 27. A removable pin 29 engages the handle E and the walls of the sockets 28.

The links 21 and 26 extend at an acute angle relative to and in close proximity to each other and the inner end of the rocker arm D is formed with a projection 30 arranged to protrude between the links 26 and to abut the link 21 to form a stop to limit upward swinging movement of the link 21 and its connections.

Means are provided to lock the rocker arm when positioned with its projection 30 abutting the link 21 which is here shown as embodying a transverse slot 31 formed in the upper margin of the rocker arm arranged to be engaged by a latch 32 pivoted at 33 on the rear end of the bed 5.

The pairs of rods 11 and 12 diverge slightly relative to each other from their intersection with the rock shafts 9 and 10 so that when the rods 11 and 12 connecting the rock shaft 9 with the axle 13 are extended vertically or nearly so, the rods 11 and 12 connecting the rock shaft 10 with the axle 14 will extend downwardly at a diverging inclination relative to the vertical as shown in Fig. 2. When the parts are thus positioned the load of the bed 5 bearing downward on the rock shaft 10 will tend to swing the running gear rearwardly and upwardly and thus cause the yoke 19 to exert a thrust on the link 21 to cause the latter to bear against the projection 30 of the rocker arm C.

Mounted on the rear end of the bed 5 is a stop 34 positioned to afford an abutment for the stem 27 when the rocker arm D is disposed in its normal position with the running gear B in its elevated position as shown in Fig. 1.

In the operation of the invention when it is desired to employ the structure as a cradle, the handle E is removed and the rocker arm C is disengaged from the catch 32 and the stem 27 constituting its outer end is swung to an upwardly extending position as shown in Fig. 1 and in dotted lines in Fig. 2 causing the opposite end of the rocker arm to swing downwardly and act through the links 26 to swing the toggle composed of the link 21 and yoke 19 downwardly and forwardly and thus cause the running gear to swing forwardly and upwardly to a position where the wheels 15 will be disposed above the rocker 6 so that the latter may rest on the floor and thus afford a rocking support for the bed.

In order to hold the running gear in the elevated position the rocker arm is urged to a position to bring the pivots 20, 25 and 24 in alignment or with the pivot 25 slightly past the plane intersecting the centers of the pivots 20 and 24 so that the load of the elevated running gear will exert a thrust on the yoke 19 and link 26 tending to swing the upper end of the rocker arm D inwardly against the stop 34 whereby the running gear is releasably locked in its elevated position.

When it is desired to convert the cradle into a perambulator, the stem 27 of the rocker arm C is swung outwardly and downwardly which action moves the pivot 25 connecting the rocker arm with the links 26 to a position above a plane intersecting the pivots 20 and 24, whereupon the running gear D will swing downwardly until the wheels thereof abut the floor. The handle E is then affixed to the stem 27 of the rocker arm if desired to afford increased leverage and the outer end of the rocker arm swung downwardly so as to move its inner end upwardly and thus exert a pull on the links 26 and thereby swing the toggle D outwardly and upwardly. This movement causes the wheels 15 to move rearwardly or causes the bed 5 to move upwardly and forwardly thus raising the bed and its rockers to an elevated position with the rockers arranged clear of the floor as shown in Fig. 2.

This relative movement of the wheels and bed is continued until the link 21 is brought to bear against the projection 30 on the rocker arm C. When this occurs the parts are brought to rest with the rods 11 and 12 connecting the rear axle 14 to the rock shaft 10 extending downwardly and rearwardly from the latter so that downward thrust of the load of the superstructures will tend to retain it in its elevated position. The rocker arm D is brought to rest by reason of the projection 30 thereof being formed with an elongated surface which abuts the upper face of the link 21 which coupled with the acute angled relation of the link 26 with the link 25 serves to limit or inhibit upward movement of the rocker arm, which will come to rest with the slot 31 thereon aligned with the latch 32. On moving the latch 32 in engagement with the slot 31, the rocker arm D is releasably held fixed relative to the bed and running gear thus fastening the latter in its operative position. The structure can now be utilized as a perambulator and may be pushed and pulled as through the handle E.

I claim:

1. In a combination cradle and perambulator embodying a body, a pair of rockers thereon, and a vertically swinging running gear carried on said body adapted to be disposed in either an advanced or a retracted position relative to said rockers; a rocker-arm carried on said body, toggle-link connections between said body and said running gear, and a link connecting said rocker arm to said toggle-link connections cooperable with the latter to swing the running gear to and from either of its positions on swinging said rocker arm.

2. The structure called for in claim 1 together with means engageable with said rocker-arm to releasably hold it against movement with the running gear disposed in its advanced position.

3. In a combination rocker and perambulator, a body, a vertically swinging running gear on said body for movement to and from a retracted or an advanced position embodying a wheeled axle, a yoke pivotally attached to said axle, a rocker-arm pivoted on said body, a link leading from one end of said rocker-arm to said yoke, a pivot connecting said link to the outer end of said yoke, and a link connected to said pivot having its outer end connected relative to said body.

4. In a combination rocker and perambulator, a body, a vertically swinging running gear on said body for movement to and from a retracted or an advanced position embodying a wheeled axle, a yoke pivotally attached to said axle, a rocker-arm pivoted on said body, a link leading from one end of said rocker-arm to said yoke, a pivot connecting said link to the outer end of said yoke, a link connected to said pivot having its outer end connected relative to said body, said last link being arranged to abut said rocker-arm when said running gear is in its advanced position.

5. In a combination rocker and perambulator, a body, two pair of depending rods supported on said body for vertical swinging movement, a wheeled axle carried by each pair of said rods, ties connecting the pairs of rods, a yoke connected to one of said axles, a pair of links pivotally attached to said yoke, and a rocker-arm pivotally mounted on said body; one of said links being pivotally connected to said rocker-arm and the other of said links being pivotally connected for swinging movement relative to said body and extending intermediate said yoke and the other of said links; said rocker-arm, links and yoke being operable to swing said depending rods to and from one side of the vertical to and from the other side of the vertical to retract and advance said wheeled axles.

6. In a combination rocker and perambulator, a body, two pair of depending rods supported on said body for vertical swinging movement, a wheeled axle carried by each pair of said rods, ties connecting the pairs of rods, a yoke connected to one of said axles, a pair of links pivotally attached to said yoke, and a rocker-arm pivotally mounted on said body; one of said links being pivotally connected to said rocker-arm and the other of said links being pivotally connected for swinging movement relative to said body and extending intermediate said yoke and the other of said links; said rocker-arm, links and yoke being operable to swing said depending rods to and from one side of the vertical to and from the other side of the vertical to retract and advance said wheeled axles; the pivotal connection between the rocker-arm and the link attached thereto being arranged for positioning on a plane extending through the pivotal connection of said link with said yoke and the pivotal mounting of said rocker-arm when said rocker-arm and link are disposed in a position to swing said depending bars upwardly at one side of the vertical to retract said axles and said rocker-arm and the other link being adapted to abut each other when the rocker-arm and links are positioned to dispose the depending bars on the other side of the vertical to advance said axles.

7. The structure called for in claim 6 together with means for releasably holding said rocker-arm against movement when disposed in a position to advance said axles.

HARRY B. LIGHT.

REFERENCES CITED

The following references are of record in the file of this patent:

UNITED STATES PATENTS

| Number | Name | Date |
|---|---|---|
| 365,471 | Hancock | June 28, 1887 |
| 1,060,123 | Raymond | Apr. 29, 1913 |
| 1,233,735 | Webley | July 17, 1917 |
| 1,289,479 | Lafferty | Dec. 31, 1918 |
| 1,419,558 | Godin | June 13, 1922 |